United States Patent
Song et al.

(10) Patent No.: US 6,848,025 B2
(45) Date of Patent: Jan. 25, 2005

(54) METHOD AND SYSTEM FOR PROGRAMMABLE REPLACEMENT MECHANISM FOR CACHING DEVICES

(75) Inventors: Seungyoon Peter Song, East Palo Alto, CA (US); Seungtalk Michael Song, Palo Alto, CA (US)

(73) Assignee: Elan Research, Inc., Palo Alto, CA (US)

( * ) Notice: Subject to any disclaimer, the term of this patent is extended or adjusted under 35 U.S.C. 154(b) by 464 days.

(21) Appl. No.: 10/045,127

(22) Filed: Oct. 26, 2001

(65) Prior Publication Data

US 2003/0084247 A1 May 1, 2003

(51) Int. Cl.[7] .............................................. G06F 13/00
(52) U.S. Cl. ....................................... 711/128; 711/133
(58) Field of Search ................................ 711/128, 129, 711/133, 163; 345/552, 557

(56) References Cited

U.S. PATENT DOCUMENTS

| | | | | |
|---|---|---|---|---|
| 5,831,640 A | * | 11/1998 | Wang et al. ................ 345/552 |
| 5,970,509 A | * | 10/1999 | Green ......................... 711/128 |
| 6,205,519 B1 | * | 3/2001 | Aglietti et al. .............. 711/133 |
| 6,571,317 B2 | * | 5/2003 | Supnet ........................ 711/133 |
| 6,643,737 B1 | * | 11/2003 | Ono ............................ 711/128 |
| 6,732,238 B1 | * | 5/2004 | Konas et al. ................ 711/128 |

* cited by examiner

Primary Examiner—Pierre M. Vital
(74) Attorney, Agent, or Firm—Sawyer Law Group LLP

(57) ABSTRACT

A caching device using an N-way replacement mechanism is disclosed. The replacement mechanism comprises at least one replacement order list with N positions, with the first-to-replace position at one end and the last-to-replace position at the opposite end, each position containing a way number, N way comparators, a control unit, a replacement order generator, and receiving a hit signal and, in case of a hit, a hit way number. A system and method in accordance with the present invention provides a programmable replacement mechanism applicable to caching devices, such as instruction and data caches and TLBs (translation lookaside buffers) in processors or texture map caches in graphics systems, that use set associative or fully associative organization. A replacement order list is maintained that specifies the order of which the elements in a set are to be selected for replacement.

43 Claims, 12 Drawing Sheets

Set - associative caching device organized as M number of sets with N elements in each set.

Replacement order generator producing
new replacement order when a reference
is hit on element residing in way B.

Replacement order generator producing new
replacement order when a reference is a miss.

| Access Result | mux 1 | mux 2 | mux 3 | mux 4 | mux 5 | mux 6 | mux 7 | mux 8 |
|---|---|---|---|---|---|---|---|---|
| miss | R | R | R | R | R | R | R | F |
| hit 1 | R | R | R | R | R | R | R | H |
| hit 2 | S | R | R | R | R | R | R | H |
| hit 3 | S | S | R | R | R | R | R | H |
| hit 4 | S | S | S | R | R | R | R | H |
| hit 5 | S | S | S | S | R | R | R | H |
| hit 6 | S | S | S | S | S | R | R | H |
| hit 7 | S | S | S | S | S | S | R | H |
| hit 8 | S | S | S | S | S | S | S | H/S |

Table 1

FIG.5A

When a reference is a miss and the reference partition consists of positions 3-6.

When a reference hits on way D that resides in a position within the reference partition consisting of positions 3-6.

When a reference hits on way E that resides in a position outside the reference partition consisting of positions 3-6.

Miss

| ID | Access Result | mux 1 | mux 2 | mux 3 | mux 4 | mux 5 | mux 6 | mux 7 | mux 8 | Fsel |
|---|---|---|---|---|---|---|---|---|---|---|
| Y | miss  | S | S | R | R | R | F   | S | S | 3 |
| Y | hit 1 | F | S | R | R | R | H   | S | S | 3 |
| Y | hit 2 | S | F | R | R | R | H   | S | S | 3 |
| Y | hit 3 | S | S | R | R | R | H   | S | S | 3 |
| Y | hit 4 | S | S | S | S | R | H   | S | S | 3 |
| Y | hit 5 | S | S | S | S | R | H/S | S | S | 3 |
| Y | hit 6 | S | S | S | R | S | H   | F | S | 3 |
| Y | hit 7 | S | S | R | R | R | H   | S | S | 3 |
| Y | hit 8 | S | S | R | R | R | H   | S | F | 3 |

Table 2

FIG.8A

Hit on way C, which resides in private partition.

Hit on way D, which resides in shared partition.

Hit on way J, which resides outside the shared and private partitions.

Locking an element that is not in the caching device.

| ID | Access Result | mux 1 | mux 2 | mux 3 | mux 4 | mux 5 | mux 6 | mux 7 | mux 8 | Fsel | Bsel |
|---|---|---|---|---|---|---|---|---|---|---|---|
| W | miss | R | R | B | S | S | R | R | F | 1 | 6 |
| W | hit 1 | R | R | B | S | S | R | R | H | 1 | 6 |
| W | hit 2 | S | R | B | S | S | R | R | H | 1 | 6 |
| W | hit 3 | S | S | B | S | S | R | R | H | 1 | 6 |
| W | hit 4 | R | R | B | F | S | R | R | H | 1 | 6 |
| W | hit 5 | R | R | B | S | F | R | R | H | 1 | 6 |
| W | hit 6 | S | S | S | S | S | R | R | H | 1 | 6 |
| W | hit 7 | S | S | S | S | S | S | R | H | 1 | 6 |
| W | hit 8 | S | S | S | S | S | S | S | H/S | 1 | 6 |

Table 3

FIG.12A

Locking an element that is in caching device but is unlocked.

Unlocking an element that is in caching device.

METHOD AND SYSTEM FOR PROGRAMMABLE REPLACEMENT MECHANISM FOR CACHING DEVICES

FIELD OF THE INVENTION

The present invention relates generally to data processing systems and more particularly to a replacement mechanism for caching devices in such systems.

BACKGROUND OF THE INVENTION

Set Associative Organization and Replacement Algorithms

Data processing systems use relatively small but quickly accessible caching devices to hold frequently referenced information, reducing the time required to access such information when it is found in the caching devices. Since the caching devices are small compared with system memory and, therefore, can hold only a subset of all referenced data, the effectiveness of the devices is determined by the management policies, such as replacement, partitioning, and locking policies. Some example caching devices are instruction and data caches and TLBs found in computer systems and texture map caches used in graphics systems.

There is numerous prior art related to the implementation of replacement policies. Some are listed here in no particular order. The U.S. Pat. No. 4,334,289 describes using one bit to denote relative age, or reference order, between each pair of elements in a set. The U.S. Pat. No. 4,783,735 describes using content address memory and relative age information for each element in a set to implement the LRU replacement policy. The U.S. Pat. Nos. 5,140,690, 5,325,511 and 5,845,320 describe using six bits per set to implement LRU replacement policy for 4-way set associative cache. The U.S. Pat. No. 5,717,916 describes fully associative cache implementation using a pointer in each cache location to point to the next cache location, an LRU pointer and a MRU (most recently used) pointer. The U.S. Pat. No. 6,098,152 describes not MRU (most recently used) replacement policy. The U.S. Pat. No. 6,205,519 describes managing shared cache in multithreaded processors.

Caching devices are generally organized as set associative, as shown in FIG. 1, having M number of sets with N elements in each set. Such a device is said to use N-way set associative organization and provides N places within a set for an element to reside in the caching device. A direct mapped organization can be viewed as a degenerative case of set associative organization, in which there is only one way in each set. That is, N is 1. A fully associative organization is the most general form of set associative organization, in which there is only one set containing all elements. That is, M is 1.

When the caching device is accessed with a reference address, a portion of the address—known as the reference index—identifies one of the M sets. The index is used to read the N number of cache tags, as well as other cache management information, associated with the identified set. The tags are compared with another portion of the reference address—known as the reference tag—to determine if the data associated with the reference address resides in the caching device. If the reference tag matches one of the N cache tags, the condition known as a hit, the data associated with the reference address is in the caching device. In addition, some cache management information, such as relative reference order among the elements in the set, may be updated.

Empirical studies show that a set associative organization with a larger set size generally offers higher hit rates, and therefore better performance, than one with a smaller set size. For instance, a 4-way set associative organization offers higher hit rates than a direct mapped organization because it can keep up to four elements that are mapped to the same set while the direct mapped organization can keep only one of the four at any given time.

Hit rates are also subject to the replacement policy used to select one of the elements present in cache to evict to make room for a new element in a set, since each set can hold a finite number of elements at any given time. The random replacement policy randomly selects one way and evicts the element in it, requiring little hardware to implement. The round-robin replacement policy selects each way in a set in turn and evicts the element happened to be in the selected way. The FIFO (first-in-first-out) policy selects the way whose element that has been in the set the longest to evict. The LRU replacement policy selects the way whose element that has not been referenced for the longest to evict. Empirical studies also show that the LRU policy offers higher hit rates than other policies. Implementing the true LRU algorithm is difficult, however, since it requires knowing the relative reference order of all elements in each set. Accordingly, what is needed is a replacement mechanism for set associative caches. The present invention addresses such a need.

SUMMARY OF THE INVENTION

A caching device using an N-way replacement mechanism is disclosed. The replacement mechanism comprises at least one replacement order list with N positions, the at least one replacement order list arranged with the first-to-replace position at one end and the last-to-replace position at the opposite end, each position containing a way number, N way comparators, a control unit, a replacement order generator, and receiving a hit signal and, in case of a hit, a hit way number.

A system and method in accordance with the present invention provides a programmable replacement mechanism applicable to caching devices, such as instruction and data caches and TLBs (translation lookaside buffers) in processors or texture map caches in graphics systems, that use set associative or fully associative organization. A replacement order list is maintained that specifies the order of which the elements in a set are to be selected for replacement.

BRIEF DESCRIPTION OF THE DRAWINGS

FIG. 5A is a table which summarizes the function of replacement order generator in enforcing the LRU policy.

FIG. 8A is a table which shows the cases that are possible with the example reference partition.

FIG. 12A is a table which shows the entries needed for enforcing the LRU policy for the user that has the example shared and private partitions.

DETAILED DESCRIPTION

The present invention relates generally to data processing systems and more particularly to a replacement mechanism for caches in such systems. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A system and method in accordance with the present invention provides a programmable replacement mechanism applicable to caching devices, such as instruction and data caches and TLBs (translation lookaside buffers) in processors or texture map caches in graphics systems, that use set associative or fully associative organization. A replacement order list is maintained that specifies the order of which the elements in a set are to be selected for replacement. For instance, to enforce LRU (least recently used) replacement policy, the list is organized and maintained with the least recently used element at one end and the most recently used element at the other end at all times, so that the least recently used element can always be found at the designated place in the list. This mechanism allows any replacement policy to be used, enabling an implementation to offer programmable replacement policy. It also allows the replacement order lists to be partitioned, with each partition being managed independently of the other partitions in a set, allowing a caching device to be shared among multiple instruction and data accesses found in single-threaded or multithreaded processor or multiprocessors. In addition, it also allows any number of elements in a set to be locked, preventing the locked elements from being replaced.

Description of Programmable Replacement Mechanism

Figure 1:
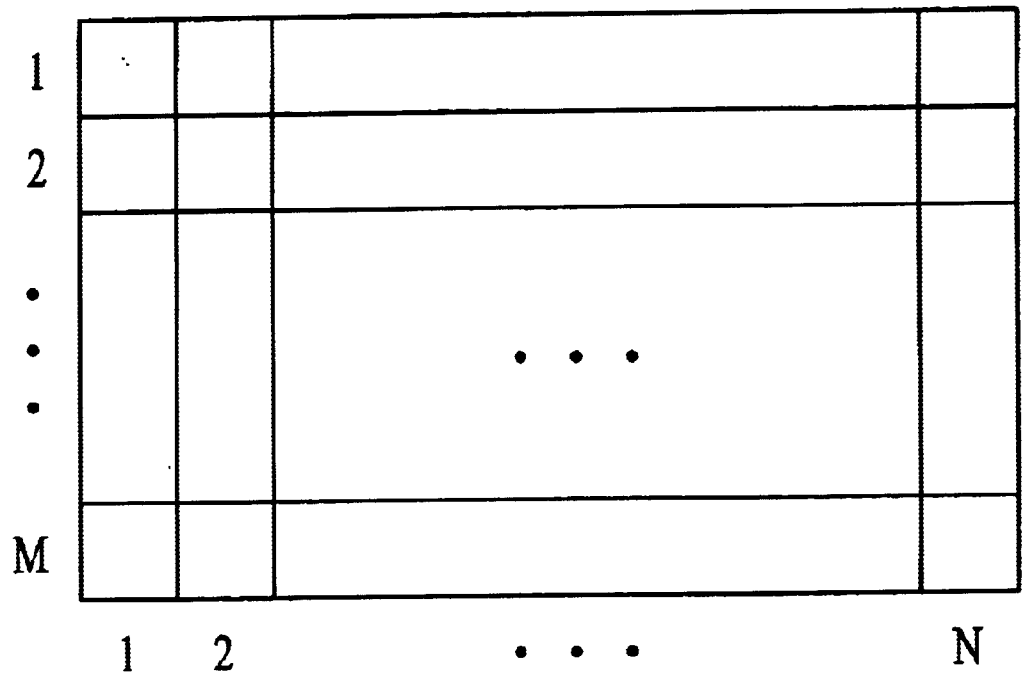
FIG. 1 illustrates a set associative cache.
Figure 2:
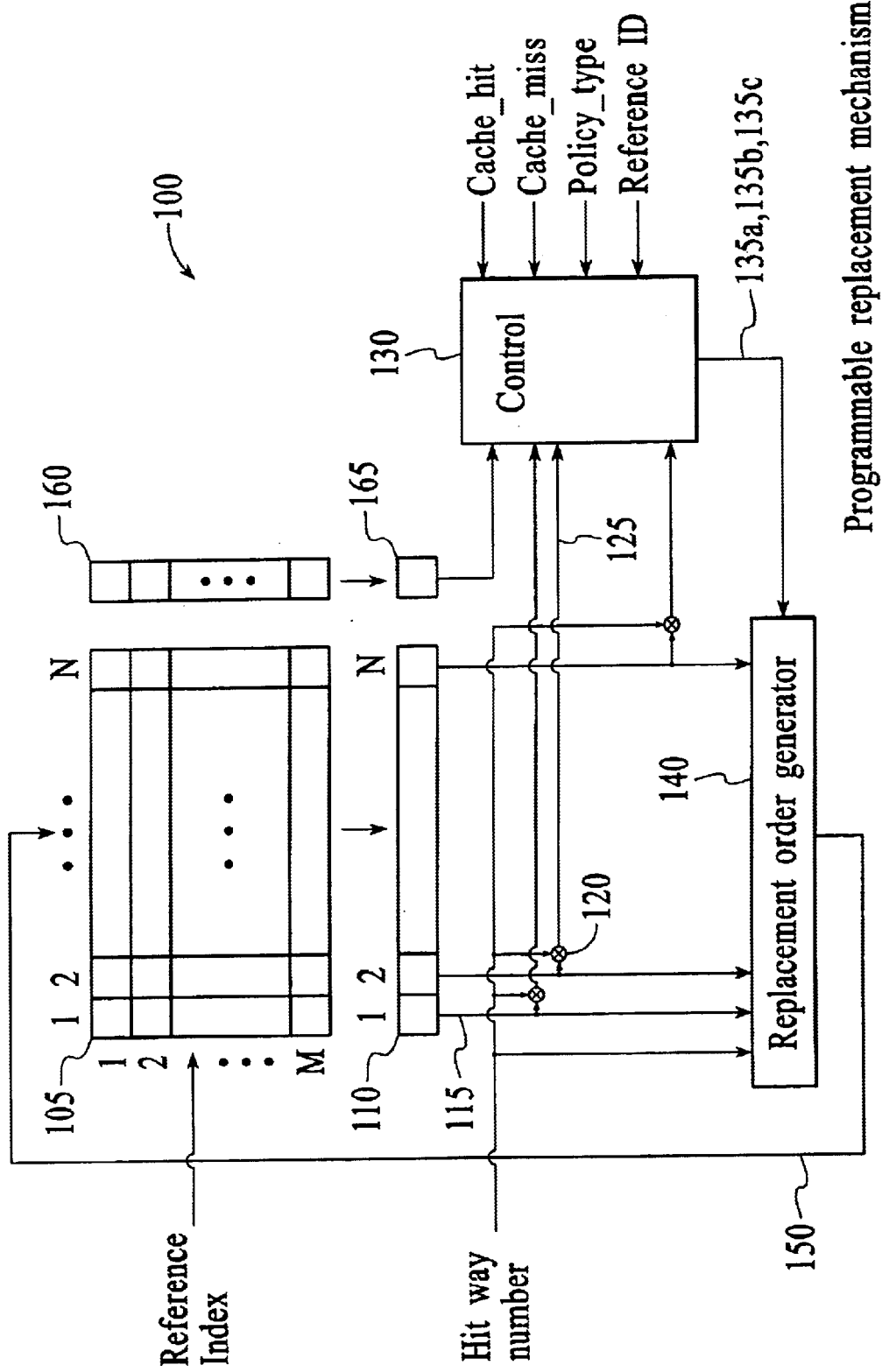
FIG. 2 shows a programmable replacement mechanism for an N-way set associative caching device.

FIG. 2 shows a programmable replacement mechanism 100 for an N-way set associative caching device. The caching device has M sets with each set containing N ways. The mechanism 100 consists of M number of replacement order lists, one for each of M sets, N number of way comparators 120, a control unit 130, and a replacement order generator 140. The replacement order lists can be kept with the tags in the tag array or, preferably as shown in FIG. 2, in a separate replacement order list array 105. Each replacement order list contains N items, each item representing one of the N ways, arranged in an order suitable for a replacement policy in use. For instance, to support LRU policy, the list can be organized and maintained with the MRU way at the Nth position and the LRU way at the 1st position. In general, the replacement order list is organized and maintained to have the way that is the first to be replaced at one end, the 1$^{st}$ position in FIG. 2, and the way that is the last to be replaced at the other end, the Nth position in FIG. 2. Each item in the replacement order list is an encoded value of the way it represents. For example, the ways 0 and 1 of 8-way set associative organization can be represented by the 3-bit binary encoded values of 000 and 001, respectively.

The mechanics of managing the replacement order list is now described. When the caching device is accessed with a reference address, the reference index identifies one of the M sets and is used to read the N number of cache tags and the replacement order list 110 associated with the set. Each of the N cache tags is compared with the reference tag and, if a match occurs, the cache-hit signal is asserted and the way containing the matching tag is identified. The number representing the identified way is encoded using the same scheme used for encoding the ways in replacement order lists. This hit way number is then compared against each of the N items in the selected replacement order list 110 to determine where in the list the hit way resides. One of the N way comparators 120 signals one of the replacement order position match signals 125. The control unit 130 uses these match signals 125, the cache-hit, the cache-miss, the replacement policy type, and other control signals, to be introduced later, to generate the control signals 135a, 135b and 135c. The replacement order generator 140 generates the new replacement order 150, in response to these control signals, which is then updated to the selected replacement order list.

Figure 3:
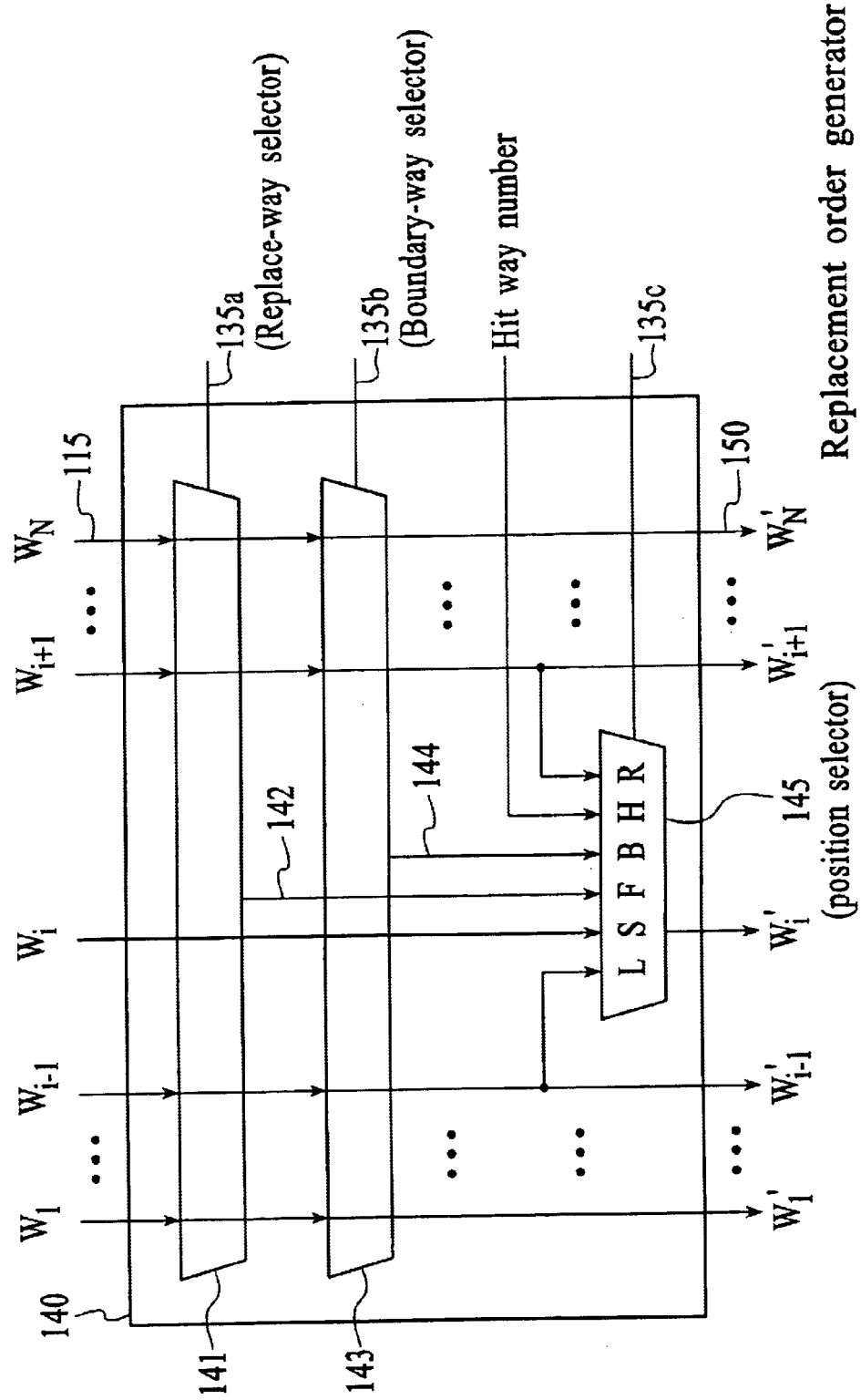
FIG. 3 shows a replacement order generator showing only one position selector having six inputs to simplify the description.

The replacement order generator 140 consists of an N-input replace-way selector 141, an N-input boundary-way selector 143, and N number of position selectors 145, one for each of the N positions, as shown in FIG. 3. Each position selector 145 can be a 2-input multiplexor to support any replacement policy, a 5-input multiplexor to support partitioning, or a 6-input multiplexor to support locking and partitioning. FIG. 3 shows only one position selector 145 having 6 inputs to simplify the description. The S input to a position selector is the way number from the corresponding position, used to select the same way number. The R input is the way number from the adjacent right position, used to shift left by one position to make room for inserting a way number into the last-to-replace position. The H input is the hit way number, which is to be selected by the last-to-replace position on a cache hit condition. The F input is the replace way number from the first-to-replace position, which is to be selected by the last-to-replace position on a cache miss condition. The replace-way selector 141 produces the replace way number 142. The L input is the way number from the adjacent left position, used to shift right by one position when moving a way number from an unlocked position to a locked position. The sixth input is the boundary way number from the first-to-replace position within a private partition, which is to be selected by the last-to-replace position within a shared partition. The boundary-way selector 143 generates the boundary way number 144 from a private partition. It should be evident from the descriptions below that not all position selectors need all 6 inputs and various simplifications can be made, especially if locking or partitioning is not supported.

Description of LRU Replacement

Figure 4:
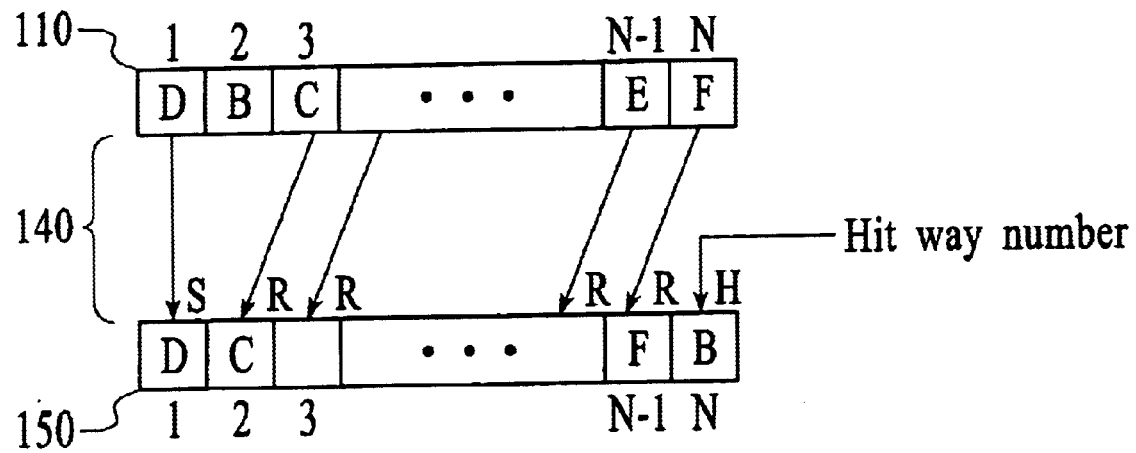
FIG. 4 shows which inputs the position selectors choose when a hit occurs on the element residing in way number B.

The replacement order generator implementing the LRU policy is now described. FIG. 4 shows which inputs the position selectors choose when a hit occurs on the element residing in way number B. For the LRU replacement policy, the list is organized and managed to hold the first-to-replace, or the LRU, way in the $1^{st}$ position and the last-to-replace, or the MRU, way in the Nth position. The hit way number B is in the $2^{nd}$ position. The $1^{st}$ position selector chooses its S input, which is the way number from its corresponding position in the replacement order list. The $2^{nd}$ to the N−1th position selectors choose the R input, which is the way number from their adjacent right position. The Nth position selector chooses the H input, which is the hit way number. The result is that the hit way number B is placed into the last-to-replace position. The ways that were more recently used than B are shifted by one position toward the LRU position. The ways that were less recently used than B remain in their positions.

Figure 5:
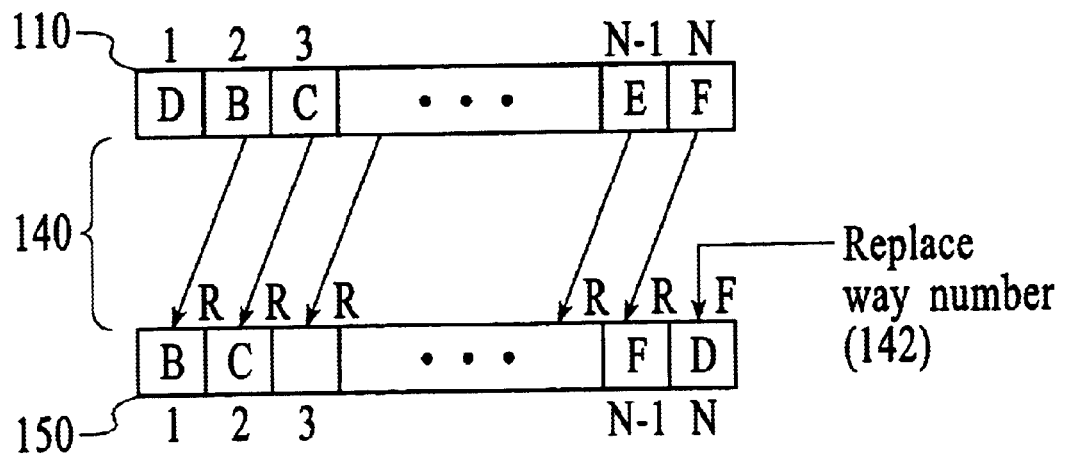
FIG. 5 shows which inputs the position selectors choose when a miss occurs.

FIG. 5 shows which inputs the position selectors choose when a miss occurs. The Nth position selector chooses the F input, which is the replace way number 142. This is to replace the element in the LRU way with the desired element and make this way the most recently used. All other position selectors choose their R input, which is the way number from their adjacent right position. This results in the LRU way being placed into the MRU position and all other ways being moved to one position closer to the LRU position.

Table 1 of FIG. 5A summarizes the function of the replacement order generator 140 in enforcing the LRU policy for an 8-way set-associative caching device. The rows show the miss and the eight hit cases, and the columns show the input selection for each of the eight position selectors. Notice that the last-to-replace position selector, labeled as "mux 8", needs only the F and H inputs and all other position selectors need only the S and R inputs. The replace-way and the boundary-way selectors are not needed, since the $1^{st}$ position is always the first-to-replace position.

Description of Programmable Replacement Policies

The replacement order generator can be used to enforce many other replacement policies. To enforce round robin or first-in-first-out policies, the replacement order list is not modified on a hit, which keeps the replacement order same as when it was last updated on a miss. On a miss, the LRU scheme shown in FIG. 5 is used to replace the element in the first-to-replace way with the desired element. To enforce the not-MRU policy, the LRU mechanism described earlier can be used, since the LRU policy is a subset of the not-MRU policy in which the LRU way is always selected for replacement.

The replacement order generator can also enforce a variation of LRU policies. For instance, if the policy is to replace first the LRU way if it holds unmodified data, second the next LRU way if it holds unmodified data, and lastly the LRU way (which holds modified data), this priority and information related to whether or not the ways hold modified data can be used to control the replace-way selector instead of always choosing the first-to-replace way as required in the original LRU policy. It should be evident that, with the replacement order list maintaining the order of which the ways are to be replaced, enforcing any replacement policy simply requires reordering the ways using the multiplexors in the replacement order generator.

The replacement mechanism being presented becomes programmable if the control unit 130 is implemented using a programmable device, such as registers or random access memory. Since there are exactly N+1 outcomes with an N-way set-associative caching device—the cases being the miss and a hit in each of the N ways—the values for the control signals 135c can be stored in a programmable device with N+1 entries. The content of each entry would be determined by the replacement policy to be enforced, as Table 1 shows for enforcing the LRU policy. For enforcing the first-in-first-out policy, the contents of the eight hit cases in the table would be changed to have each of the eight position selectors choose the S input. The programmable replacement mechanism can support any replacement policy as long as the policy requires the position selectors to choose from the existing inputs.

Description of Partitioning

A caching device can be divided into partitions, with each partition assigned exclusively to a different user. For example, a caching device can be partitioned so that each partition is assigned exclusively to one processor in multiprocessor systems or one thread in multithreaded systems. Even within a single-processor, single-threaded system, a caching device can be partitioned so that one partition is assigned exclusively to hold instructions, another to hold stack operands, and yet another to hold other types of data operands. It may even be desirable to have one partition be shared among different users. Since the purpose of partitioning is to guarantee a portion of the caching device for each user, the replacement mechanism employed in the caching device has to support partitioning.

The programmable replacement mechanism supports partitioning by grouping the positions within replacement order lists. As an example, the 8-entry replacement order lists used in an 8-way set-associative caching device can be divided into three partitions: X consisting of the first and second positions, Y consisting of the third, fourth, fifth and sixth positions, and Z consisting of seventh and eighth positions. Within each partition, the leftmost position could be used to hold the first-to-replace way number and the rightmost position could be used to hold the last-to-replace way number or vice versa. For instance, the partition Y in the previous example could keep its first-to-replace way number in the third position and its last-to-replace way number in the sixth position.

It is important to understand the difference between partitioning described in this disclosure and in the U.S. Pat. No. 6,205,519 by Aglietti et al. The Aglietti's partitioning is based on ways whereas ours is based on replacement order list positions. Using their approach, the example partitions X, Y and Z described earlier would consist of ways 1–2, 3–6, and 7–8, respectively. Using our approach, the same partitions X, Y, and Z could consist of any set of two, four, and two ways, respectively. Which ways are assigned to each partition in each set would depend on the states of each of the replacement order lists when the partitions were defined. That is, the partition X could actually consist of, for example, ways 2 and 3 in one set but ways 3 and 7 in another set. This flexibility allows partitions to be changed dynamically, allowing new partitions to be created and existing partitions to be merged at any time.

When a user accesses the caching device, it presents an identifier, known as the reference ID, in addition to the reference address to the caching device. The reference ID specifies a partition, known as the reference partition, in manners to be described later. An access results in a miss, a hit on a way within the reference partition, or hit on a way outside the reference partition. Handling the first two cases is similar to handling a miss or a hit when partitioning is not used. The only differences are that the first-to-replace and the last-to-replace positions in the reference partition are not necessarily the 1st and the Nth positions and that the way numbers in positions outside the reference partition are not to be changed. The third case is possible because multiple users can reference same address, which could be in a shared block of memory in multiprocessor or multithreaded processor systems. One way to handle the third case is to not change the replacement order, which may be acceptable since the referenced element is in the caching device. A second way is to move the referenced element into the last-to-replace position of the reference partition. Depending on where in the other partition the referenced element resides and the sizes of the other partition and the reference partition, the former or the latter approach may give the referenced element a better chance of staying in the caching device.

Figure 6:
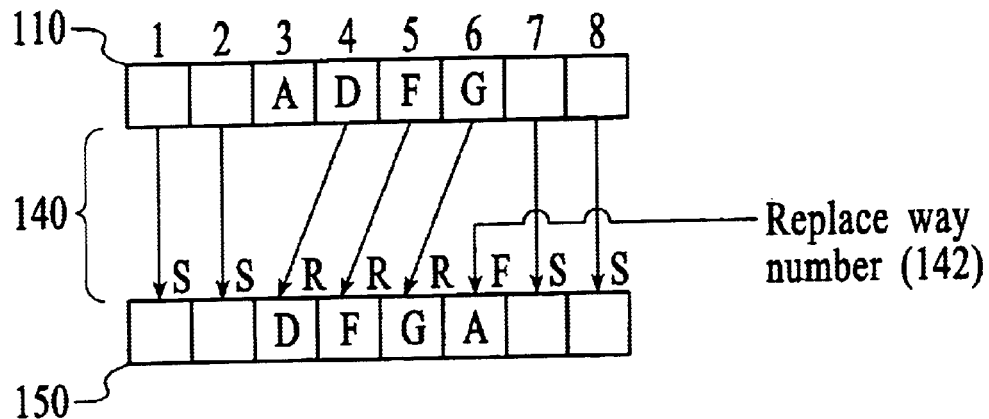
FIG. 6 shows a miss example.

For the next three examples, assume that a user has exclusive access to the partition Y in an 8-way set-associative caching device and that the partition Y consists of the positions 3–6 in replacement order lists. The LRU policy is enforced. FIG. 6 shows a miss example. The first, second, seventh and eighth positions choose the way number from their S input, since their way numbers are not to be changed. The last-to-replace position within the reference partition, which is the sixth position, chooses the replace way number 142, and the other positions within the reference partition choose the way number from their adjacent right position.

Figure 7:
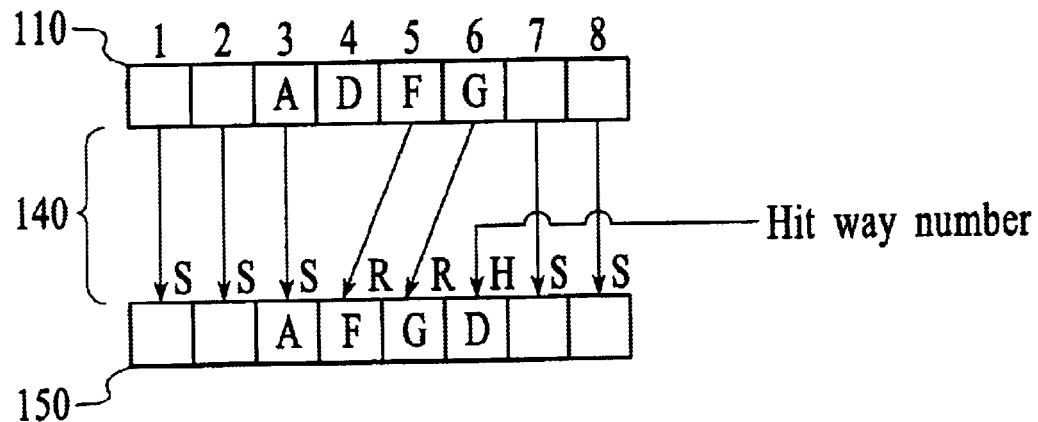
FIG. 7 shows an example in which a reference hits on a way, the way number D in this case, that resides in a position within the reference partition.

FIG. 7 shows an example in which a reference hits on a way, the way number D in this case, that resides in a position within the reference partition. As in the miss case, the positions outside the reference partition choose the way number from their corresponding position. The last-to-replace position within the reference position chooses the hit-way number. The position from the hit position to the next to the last-to-replace position within the reference partition, which are the fourth and fifth position in FIG. 7, choose the way number from their adjacent right position. The other positions within the reference partition, which is the third position in FIG. 7, choose the way number from their adjacent right position.

Figure 8:
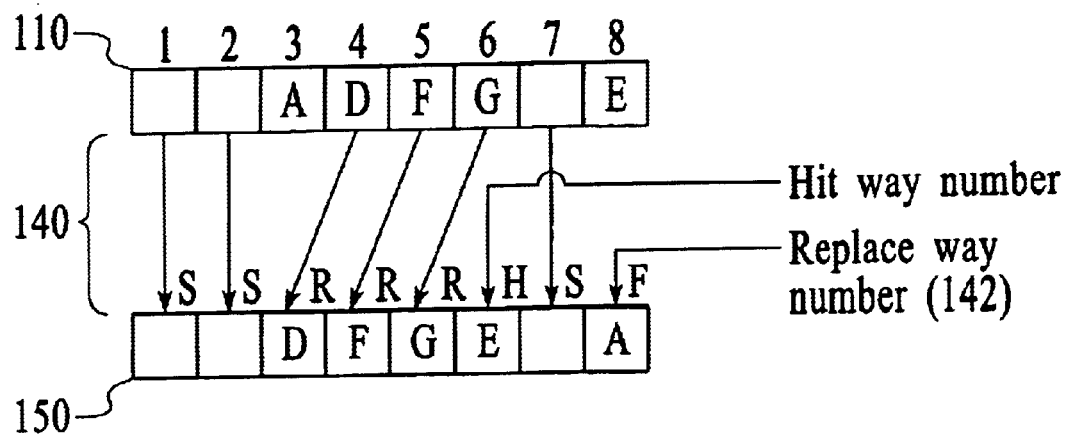
FIG. 8 shows an example in which a reference hits on a way, the way number E, that resides in a position outside the reference partition.

FIG. 8 shows an example in which a reference hits on a way, the way number E, that resides in a position outside the reference partition. In this case, the last-to-replace position in the reference partition chooses the hit way number, making it the last-to-replace position in the reference partition. The other positions in the reference partition choose the way number from their adjacent right position. In addition, the position that had the hit way number, the $8^{th}$ position in the example, chooses the replace way number 142 from the reference partition. All other positions outside the reference partition choose the way number from their corresponding position.

Table 2 of FIG. 8A shows all nine cases that are possible with the reference partition discussed in the previous three examples. The miss example shown in FIG. 6 is summarized in the miss row. The first hit case shown in FIG. 7 is summarized in the row labeled "hit 4". The second hit case shown in FIG. 8 is summarized in the last row. The last column labeled "Fsel" denotes which position the replace-way selector 141 chooses for the reference partition Y. It shows the $3^{rd}$ position since the first-to-replace way is stored in the $3^{rd}$ position for the partition Y.

The reference ID needed to support partitioning can be an N-bit mask, with each bit denoting whether the corresponding position belongs in the reference partition. For example, the partitions X, Y and Z used in an earlier example could be represented with the 8-bit masks having the values 11000000, 00111100, and 00000011, respectively. The control unit 130 can generate the signals 135a and 135c, according to the values shown in Table 2, using such a mask and cache hit, cache miss, policy type, and the replacement order position match signals 125.

Alternatively, the partition information can be built into the control unit 130, such that the reference ID is not a mask but a user ID. For instance, if the caching device were designed to support at most 4 partitions, the reference ID would be a 2-bit value. For instance, the reference ID to the X, Y, and Z partitions in previous examples could be denoted as 00, 01, and 10, respectively. To support at most 4 partitions, the control unit 130 can be implemented as a register-based or a RAM-based table consisting of 4N+4 entries, since an access to a partition results in one of N+1 cases. This table would be accessed with the 2-bit reference ID and the replacement order match signals 125, to read the control signals 135a for the replace-way selector 141 and 135c for each of the N position selectors 145. When partitioning is changed, the content of the table would also be modified to reflect the appropriate values for the signals 135a and 135c.

Description of Sharing a Partition

It is often desirable to share a partition among multiple users. For example, a caching device can be divided into three partitions consisting of ¼, ¼, and ½ so that each of two can be given exclusive access to a ¼ partition but shared access to the ½ partition. Such partitioning allows each user to use ¼ to ¾ of the caching device depending on its need and the need of the other user. Since the caching device is organized into multiple sets and multiple ways in each set, one user may use more number of ways in some sets but less number of ways in other sets. A shared partition enables multiple users to fully utilize the capacity of the shared partition. A caching device may have multiple shared partitions.

An effective way to manage a shared partition is to treat it as an extension of a private partition when handling a miss. That is, the element to be evicted is chosen from the shared partition and all other elements in both the shared and private partitions are moved one position closer to the first-to-replace position in the shared partition. Although the shared partition can be managed using any replacement policy, using the LRU policy should deliver a better hit rate than using some other replacement policy. To enforce the LRU policy, the first-to-replace way number from the private partition is moved into the last-to-replace position in the shared partition, the way numbers in the shared partition are moved one position closer to the first-to-replace position in the shared partition, and the first-to-replace way in the shared partition is selected for replacement. The boundary-way selector 143 in FIG. 3 outputs the boundary-way number 144, which is in the first-to-replace position in the private partition.

Using a shared partition, a reference can miss, hit in the private partition, hit in the shared partition, or hit outside the private and shared partitions. These four cases are now described using an 8-way set-associative caching device enforcing the LRU policy, as shown in FIGS. 9–12. The shared partition consists of positions 1–3 and the private partition consists of positions 6–8. In both partitions, the first-to-replace way number is kept in the leftmost position and the last-to-replace way number is kept in the rightmost position. Although the following four examples use only one shared and one private partition, it should be evident that the programmable replacement mechanism being presented can support multiple private partitions in conjunction with one shared partition. It should also be evident that the programmable replacement mechanism can support multiple shared partitions, with each shared partition being used with multiple private partitions.

Figure 9:
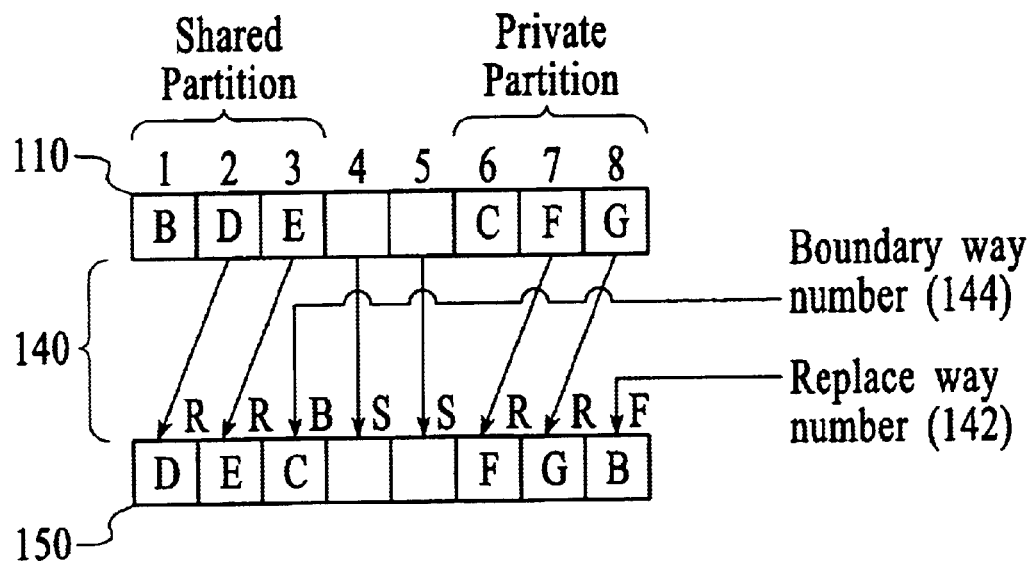
FIG. 9 shows the miss case.

FIG. 9 shows the miss case. The last-to-replace position in the private partition selects the replace way number 142, which is from the first-to-replace position in shared partition. The last-to-replace position in the shared partition chooses the boundary-way 144, denoted as the B input. The other positions in the shared and private partitions choose the way number from their adjacent right position, denoted as the R input. The remaining positions outside the shared and private partitions choose the S input.

Figure 10:
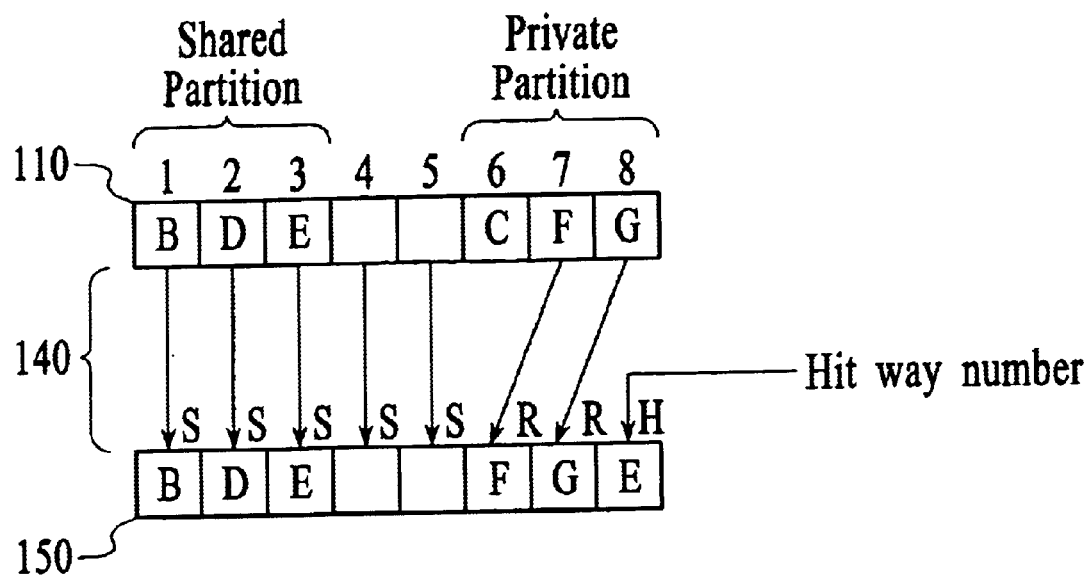
FIG. 10 shows a reference that hits on way C, which resides in the private partition.

FIG. 10 shows a reference that hits on way C, which resides in the private partition. The last-to-replace position chooses the hit way number, denoted as H input, and the other positions in the private partition choose the way number from their adjacent right position, denoted as R input. All other positions choose the S input.

Figure 11:
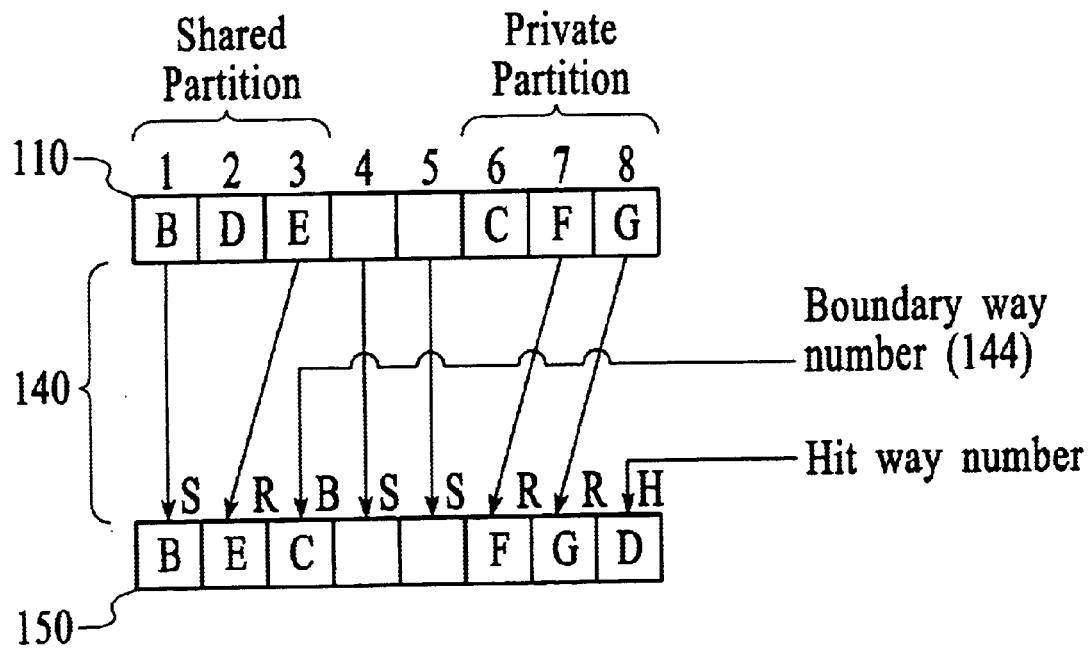
FIG. 11 shows a reference that hits on way D, which resides in the shared partition.

FIG. 11 shows a reference that hits on way D, which resides in the shared partition. The last-to-replace position in the private partition chooses the hit way number, and the other positions in the private partition choose the way number from their adjacent right position. The last-to-replace position in the shared partition chooses the boundary-way number 144, denoted as B input. The second position that held the matching way number D chooses the way number from its adjacent right position. The other position in the shared partition chooses the S input.

Figure 12:
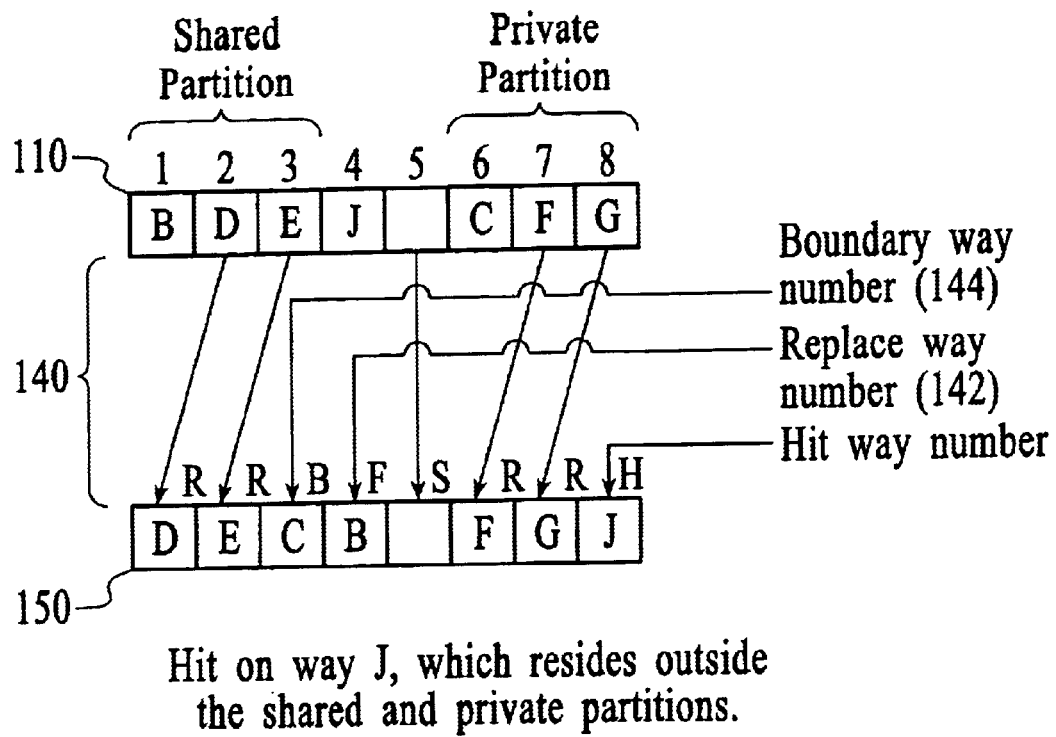
FIG. 12 shows a reference that hits on way J, which resides outside the shared and private partitions.

FIG. 12 shows a reference that hits on way J, which resides outside the shared and private partitions. One way to handle this case is not to change the replacement order. An alternative is to move the element to the last-to-replace position in the private partition. The latter approach requires the last-to-replace position in the private partition to choose the hit way number, and other positions in the private partition to choose the R input. The last-to-replace position in the shared partition chooses the boundary-way number 144 from the private partition, and all other positions in the shared partition choose the R input. The fourth position, which held the hit way number and is outside the shared and private partitions, chooses the replace-way number 142.

An N-bit mask can specify the positions within the shared and the private partitions for each user, provided that the private partition is located closer to the last-to-replace position in the replacement order list than is the shared partition. That is, a 8-bit mask having the value 11100111 can specify the shared partition consisting of positions 1–3 and the private partition consisting of positions 6–8 used in the previous four examples. If another user shares the shared partition but has a private partition consisting of positions 4–5, the mask 11111000 can specify both the shared and private partitions for the second user. Since the shared and private partitions are adjacent for the second user, the reprogrammable replacement mechanism can treat this as one partition and produce the results that are consistent with a user having disjointed shared and private partitions.

Alternatively, the partition information can be built into the control unit 130, as presented previously, so that a user can present its ID instead of a mask. The control unit 130 would keep N+1 entries for each user, with each entry containing the values for the signals 135$a$, 135$b$, and 135$c$. Table 3 of FIG. 12A shows the 9 entries needed for enforcing the LRU policy for the user that has the shared and private partitions used in the previous four examples. The column labeled "Fsel" specifies the first-to-replace position to be used, which is the first-to-replace position in the shared partition. The column labeled "Bsel" specifies the first-to-replace position from the private partition.

The shared partition doesn't have to be shared at all and can be used as a second private partition to a user. One way to handle the situation where a user is to be given more capacity of a caching device is by creating another private partition, which may be disjoint from the partition the user already owns. The methods presented for handling a shared partition is applicable to this situation, in which a user has two disjoint private partitions. The purpose of the boundary-way selector 143 is to provide a connection from one partition to another partition. It serves to reduce the number of inputs needed by each of the position selectors 145 from N, since a partition can start at any position, to just one. If a user is allowed to own up to K number of disjoint private partitions, K−1 number of boundary-way selectors could be used instead of requiring each of N position selectors to use N inputs.

Description of Locking and Unlocking

It is often desirable to have an element guaranteed to be in a caching device for a period of time. This feature is known as locking and is typically supported by a lock command, which locks a specified element into the caching device so that it cannot be replaced, and an unlock command, which undo the lock placed on a specified element so that it can be replaced. Whereas partitioning applies to all sets in a caching device, locking applies only to a specified element, requiring each element in the caching device to keep information regarding its locked state. A caching device generally limits the number of elements that can be locked in any given set to be some number less than the set size to ensure that every set can always handle a miss. The programmable replace mechanism also supports locking, as described below.

One way to hand locking is to define a locked partition and an unlocked partition in each replacement order list, allowing a caching device to support locking in conjunction with partitioning described previously. Because locking is applied to specific elements, the locked partition in one set may have different number of elements than the locked partition in other set, requiring each replacement order list to have a lock register 165, as shown in FIG. 2. Among many alternatives, the lock register can be implemented as an N-bit mask, with each bit indicating the locked or unlocked state of the corresponding position in the replacement order list. The lock register can also be implemented as a counter indicating the number of elements in the locked partition. A counter requires fewer bits than a mask and is more efficient if the caching device allows only a few elements to be locked in any given set. It is important to note that locking is applied to positions within each replacement order list and not to specific ways in each set. That is, if a lock register in a set indicates that one position is locked, it could indicate any one of the N ways being locked. This approach is different from the known locking schemes in which a lock is associated with a particular way in all sets. That is, known locking schemes typically use a lock bit in each set to indicate whether the predetermined way, for example way A, is locked.

With a caching device supporting locking, a reference could result in a miss, a hit in an unlocked element, or a hit in a locked element. On a miss, the element in the first-to-replace way in the unlocked partition is replaced with the desired element, according to the replacement policy in effect. The replacement order in the locked partition is not modified. On a hit in an unlocked element, the unlocked partition in the replacement order is adjusted, according to the replacement policy in effect. The replacement order in the locked partition is not modified. On a hit in a locked element, one of the two actions can be taken. One is to modify the replacement order within the locked partition, according to the replacement policy in effect. The other is to not modify the replacement order at all, since the elements in the locked partition will not be replaced any way. These three cases are already handled by the programmable replacement mechanism supporting partitioning.

Figure 13:
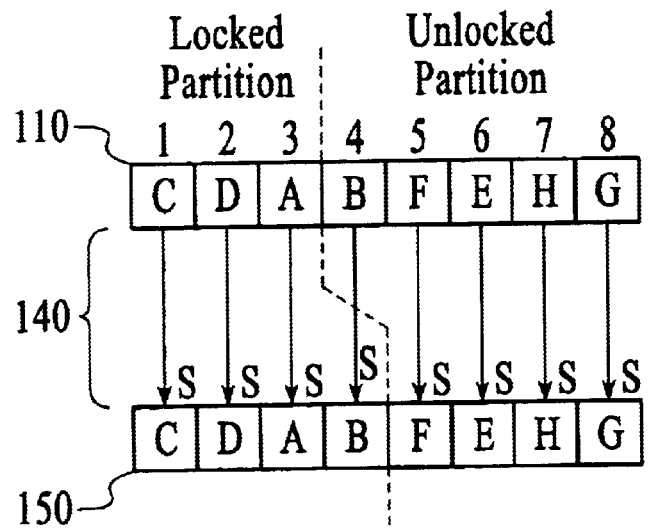
FIG. 13 shows an example of an element being added to the caching device and is to be locked.

The locking and unlocking operations are not described. FIG. 13 shows an example of an element being added to the caching device and is to be locked. The element in way B, which is in the first-to-replace position of the unlocked partition, is selected for replacement. FIG. 13 shows that the replacement order within the locked partition is not modified but the locked partition now includes one more position when the lock register is updated.

Figure 14:
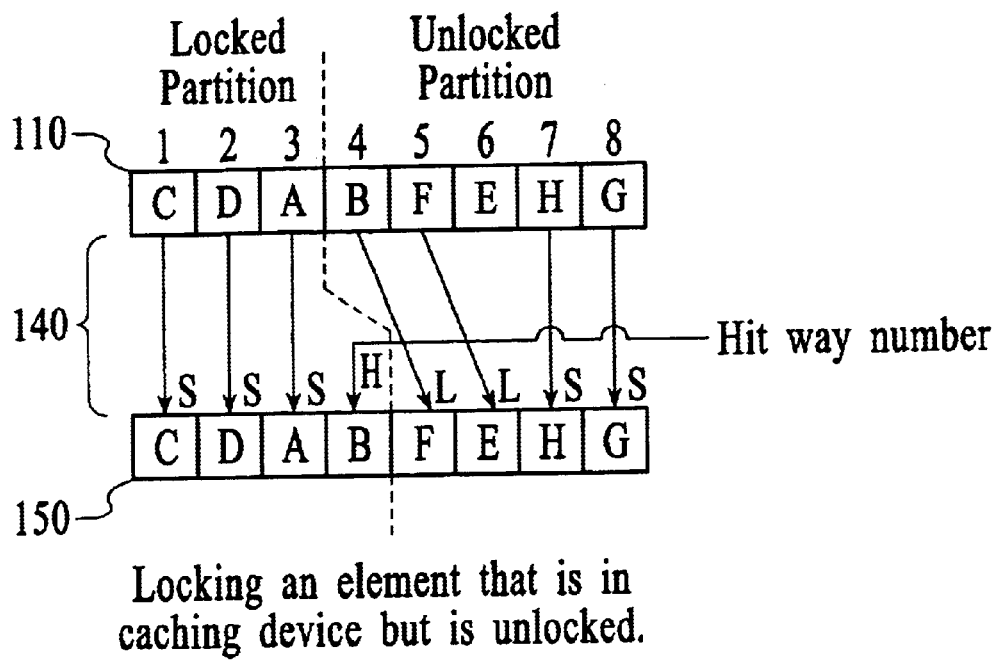
FIG. 14 shows an example of an element that is already in the caching device and is to be changed from the unlocked to the locked state.

FIG. 14 shows an example of an element that is already in the caching device and is to be changed from the unlocked to the locked state. The element is found in way E in the unlocked partition. The first-to-replace position in the current unlocked partition, which is the $4^{th}$ position, chooses the hit way number. The positions that are closer to the last-to-replace position than the position that has the hit way in the current unlocked partitions choose the S input, since their order is not to be changed. These are the positions 7–8. The remaining positions within the current unlocked partition, which are the positions 5–6, choose the way number from their adjacent left position using the L input. This maintains the LRU order within the unlocked partition. The replacement order in the locked partition is not modified, but the locked partition now occupies one more position when the lock register is updated.

Figure 15:
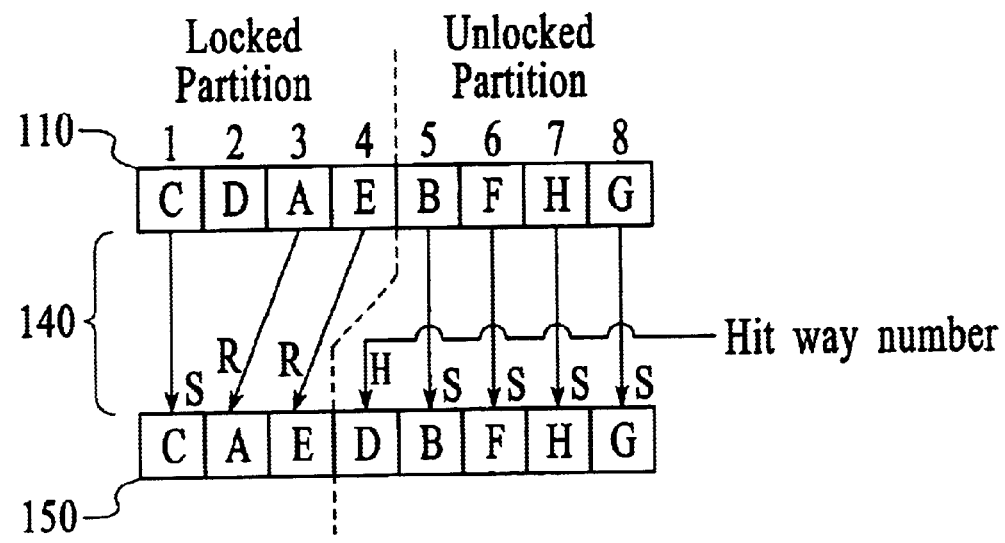
FIG. 15 shows an example of an element being changed from the locked to unlocked state.

FIG. 15 shows an example of an element being changed from the locked to unlocked state. The element to be unlocked is found in way D in the locked partition. To use existing connections in the position selectors 145, this case is treated as a hit in the locked partition. That is, the last-to-replace position in the current locked partition chooses the hit way number and the positions that have the hit way number and those that are closer to the last-to-replace position in the current locked partition, which are positions 2–3, choose the R input. The other positions in the current locked partition choose the S input. The positions in the current unlocked partition choose the S input, preserving the replacement order. When the lock register is updated, however, the newly unlocked element now resides at the first-to-replace position in the unlocked partition. This order may be desirable if the element was unlocked because it is no longer needed and, therefore, can be evicted before the other elements in the same set. It should be evident that the programmable replacement mechanism can support other policies in which a newly unlocked element is placed in a different position within the unlocked partition.

Description of Universal Replacement Mechanism

The universal replacement mechanism that can enforce any replacement policy is described. To summarize, the replace-way selector is needed when the first-to-replace way can be chosen from more than one position in the replacement order list. A boundary-way selector is needed when the positions that are to be modified together can occupy two disjoint partitions, with each partition consisting of adjacent positions in the replacement order list. To support a replacement policy that requires modifying position occupying N number of partitions, N–1 boundary-way selectors are needed. As stated earlier, applying a replacement policy results in a new replacement order of the ways within a selected set, achieved using a replace-way selector, one or more boundary-way selectors and N position selectors. The positions selectors require two or more inputs, depending on whether or not locking is used and the number of partitions to be supported.

A replacement order generator can support any replacement policy if each of the N position selectors consists of N-input multiplexors, so that it can choose a way from any one of the N positions in the replacement order list. The replace-way and boundary-way selectors are no longer needed. As stated earlier, the control unit can be built using a random access memory (RAM) or reprogrammable PLA to provide the control signals for the position selectors, allowing one to build a universal replacement mechanism.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A caching device using an N-way replacement mechanism comprising:

at least one replacement order list with N positions, the at least one replacement order list arranged with a first-to-replace position at one end and a last-to-replace position at the opposite end, each position containing a way number, N way comparators, a control unit, a replacement order generator, and receiving a hit signal and, in case of a hit, a hit way number;

a hit position in which the at least one replacement order list is determined by comparing the hit way number with the way number in each of the N positions in the at least one replacement order list using the N way comparators;

the control unit produces replacement order generator control signals using the hit signal and the hit position;

the replacement order generator comprises a replace way selector producing a replace way number and N position selectors, each consisting of a multiplexor with at least two inputs; and the position selector for the last-to-replace position which has the hit way number and the replace way number as inputs and the position selectors for the other positions which have its own way number and a replace-later adjacent way number from its adjacent position toward the last-to-replace position as inputs.

2. The caching device in claim 1 which the control unit generates the replacement order generator control signals to have the position selector for the last-to-replace position choose the hit way number, the position selectors from the hit position to the position next to the last-to-replace position choose the replace-later adjacent way number, and the position selectors for the remaining positions choose its own way number.

3. The caching device in claim 1 in which the control unit generates the replacement order generator control signals to have the position selector for the last-to-replace position choose the replace way number and position selectors for all other positions choose the replace-later adjacent way number.

4. The caching device in claim 1 in which the replace way selector always chooses the way number from the first-to-replace position in the at least one replacement order list.

5. The caching device in claim 1 in which the control unit generates the replacement order generator control signals to have the replace way selector choose the way number from at least one position in the at least one replacement order list.

6. A caching device using an N-way replacement mechanism comprising:
at least one replacement order list with N positions, the at least one replacement order list arranged with a first-to-replace position at one end and a last-to-replace position at the opposite end, each position containing a way number, N way comparators, a control unit, in which the at least one replacement order list is divided into one or more partitions with each partition arranged with the first-to-replace position at one end and the last-to-replace position at the opposite end of the partition, and the control unit receiving a reference ID indicating a reference partition, a replacement order generator, and receiving a hit signal and, in case of a hit, a hit way number;
a hit position in which the at least one replacement order list is determined by comparing the hit way number with the way number in each of the N positions in the at least one replacement order list using the N way comparators;
the control unit produces replacement order generator control signals using the hit signal and the hit position; and
the replacement order generator comprises a replace way selector producing a replace way number and N position selectors, each consisting of a multiplexor with at least two inputs.

7. The caching device in claim 6 which the reference ID is an N-bit mask, each bit denoting whether or not the associated position is in the reference partition.

8. The caching device in claim 6 which the reference ID is a user identifier, identifying the partition information associated with the reference partition kept in the control unit.

9. The caching device in claim 7 or claim 8 in which the position selector for the last-to-replace position of the at least one replacement order list has the hit way number, the replace way number and its own way number as inputs, the position selector for the first-to-replace position of the at least one replacement order list has the replace way number, its own way number and the replace-later adjacent way number as inputs, and the position selector for the remaining positions has the hit way number, the replace way number, its own way number, and the replace-later adjacent way number as inputs.

10. The caching device in claim 9 in which the control unit generates the replacement order generator control signals to have the position selector for the last-to-replace position in the reference partition choose the hit way number, the position selectors from the hit position to the position next to the last-to-replace position in the reference partition choose the replace-later adjacent way number, and the position selectors for the remaining positions within and outside the reference partition choose its own way number.

11. The caching device in claim 9 in which the control unit generates the replacement order generator control signals to have the position selector for the last-to-replace position in the reference partition choose the replace way number, the position selectors for all other positions within the reference partition choose the replace-later adjacent way number, and the position selectors for positions outside the reference partition choose its own way number.

12. The caching device in claim 9 which the control unit generates the replacement order generator control signals to have the position selector for the last-to-replace position in the reference partition choose the hit way number, the position selectors for all other positions within the reference partition choose the replace-later adjacent way number, the position selector for the hit position choose the replace way number, and all other positions outside the reference partition choose its own way number.

13. The caching device in claim 9 in which the control unit generates the replacement order generator order signals to have the replace way selector choose the way number from the first-to-replace position in the reference partition.

14. The caching device in claim 9 in which the control unit generates the replacement order generator control signals to have the replace way selector choose the way number from at least one position in the at least one replacement order list.

15. The caching device in claim 7 or claim 8 in which a user has access to at least two disjoint partitions, the partitions arranged with the first-to-replace partition toward the first-to-replace position of the at least one replacement order list and the last-to-replace partition toward the last-to-replace position of the at least one replacement order list, and the reference ID indicating the at least two disjoint reference partitions.

16. The caching device in claim 15 in which the replacement order generator consists of a replace way selector, N position selectors, and a boundary way selector for each of the partition that is not the first-to-replace partition, each boundary way selector choosing the first-to-replace way number in its partition as the boundary way number.

17. The caching device in claim 16 in which at least one of the at least two disjoint partitions is accessible by another user.

18. The caching device in claim 16 or 17 in which the position selector for the last-to-replace position of the at least one replacement order list has the hit way number, the replace way number and its own way number as inputs, the position selector for the first-to-replace position of the at least one replacement order list has the replace way number, its own way number, the replace-later adjacent way number, and the at least one boundary way number as inputs, and the position selector for the remaining positions has the hit way number, the replace way number, its own way number, the replace-later adjacent way number, and the at least one boundary way number as inputs.

19. The caching device in claim 18 in which the control unit generates the replacement order generator control signals to have the position selector for the last-to-replace position in the last-to-replace reference partition choose the hit way number, the position selectors from the hit position to the position next to the last-to-replace position in the last-to-replace reference partition choose the replace-later adjacent way number, and the position selectors for the remaining positions choose its own way number.

20. The caching device in claim 18 in which the control unit generates the replacement order generator control signals to have the position selector for the last-to-replace position in the last-to-replace reference partition choose the hit way number, the position selectors for the remaining positions in the last-to-replace reference partition choose the replace-later adjacent way number, the position selector for the last-to-replace position in the first-to-replace reference partition choose the boundary way number, the position selector from the hit position to the position next to the last-to-replace position in the first-to-replace reference partition choose the replace-later adjacent way number, and the position selectors for remaining positions in the first-toreplace reference partition and outside the reference partitions choose its own way number.

21. The caching device in claim 18 in which the control unit generates the replacement order generator control signals to have the position selector for the last-to-replace position in the last-to-replace reference partition choose the replace way number, the position selector for the last-to-replace position in the first-to-replace reference partition choose the boundary way number, the position selectors for all other positions within the reference partitions choose the replace-later adjacent way number, and the position selectors for positions outside the reference partitions choose its own way number.

22. The caching device in claim 18 in which the control unit generates the replacement order generator control signals to have the replace way selector choose the way number from the first-to-replace position in the first-to-replace reference partition.

23. The caching device in claim 18 in which the control unit generates the replacement order generator control signals to have the replace way selector choose the way number from at least one position in the at least one replacement order list.

24. The caching device in claims 1 or 6 in which the control unit is implemented using random access memory or reprogrammable logic array.

25. The caching device in claims 1 or 6 is an instruction cache.

26. The caching device in claims 1 or 6 is a data cache.

27. The caching device in claims 1 or 6 is a combined instruction and data cache.

28. The caching device in claims 1 or 6 is an instruction TLB.

29. The caching device in claims 1 or 6 is a data TLB.

30. A The caching device in claims 1 or 6 is a combined instruction and data TLB.

31. The caching device in claims 1 or 6 is a texture map cache in a graphics system.

32. The caching device in claims 1 or 6 is used in a single processor system.

33. The caching device in claims 1 or 6 is used in a multiple processor system.

34. The caching device in claims 1 or 6 is used in a multithreaded system.

35. A caching device using an N-way replacement mechanism comprising:
   at least one replacement order list with N positions, the at least one replacement order list arranged with a first-to-replace position at one end and a last-to-replace position at the opposite end, each position containing a way number, N way comparators, a control unit, a replacement order generator, and receiving a hit signal and, in case of a hit, a hit way number;
   a hit position in which the at least one replacement order list is determined by comparing the hit way number with the way number in each of the N positions in the at least one replacement order list using the N way comparators;
   the control unit produces replacement order generator control signals using the hit signal and the hit position;
   the replacement order generator comprises a replace way selector producing a replace way number and N position selectors, each consisting of a multiplexor with at least two inputs;
   the at least one replacement order list has a lock register, indicating the positions in the at least one replacement order list that are locked, and the control unit receiving the value of the lock register; and
   the at least one replacement order list is divided into unlocked and locked partitions, with the unlocked partition arranged with the first-to-replace position at one end and the last-to-replace position at the opposite end of the partition, and the lock register indicating the number of positions in the locked partition.

36. The caching device in claim 35 in which the control unit generates the replacement order generator control signals to have the position selector in the last-to-replace position in the unlocked partition choose the hit way number, the position selectors from the hit position to the position next to the last-to-replace position in the unlocked partition choose the replace-later adjacent way number and the position selectors in the remaining positions choose its own way number.

37. The caching device in claim 35 in which the control unit generates the replacement order generator control signals to have the position selector in the last-to-replace position in the unlocked partition choose the replace way number, the position selectors in the remaining positions in the unlocked partition choose the replace-later adjacent way number and the position selectors in the locked partition choose its own way number.

38. The caching device in claim 35 in which the number in the lock register is changed to the next higher value when a lock command is performed.

39. The caching device in claim 35 in which the control unit generates the replacement order generator control signals to have the position selector in the first-to-replace position in the locked partition to choose the hit way number, the position selector in the hit position to choose the replace way number, which is from the first-to-replace position in the locked partition, and the position selectors in the remaining positions choose its own way, and the number in the lock register is changed to the next lower value.

40. The caching device in claim 35 in which the control unit generates the replacement order generator control signals to have the position selector in the last-to-replace position in the at least one replacement order list choose the hit way number, the position selectors from the hit position to the position next to the last-to-replace position in the at least one replacement order list choose the replace-later adjacent way number, and the position selectors in the remaining positions choose its own way number, and the number in the lock register is changed to the next higher value.

41. The caching device in claim 35 in which the control unit generates the replacement order generator control signals to have the position selector in the last-to-replace position in the at least one replacement order list choose the replace way number and the position selectors in the remaining positions in the at least one replacement order list choose the replace-later adjacent way number, and the number in the lock register is changed to the next higher value.

42. The caching device in claim 35 in which the replace way selector always chooses the way number from the first-to-replace position in the unlocked partition.

43. The caching device in claim 35 in which the control unit generates the replacement order generator control signals to have the replace way selector choose the way number from at least one position in the at least one replacement order list.

* * * * *